United States Patent [19]

Rubin et al.

[11] Patent Number: 4,460,504
[45] Date of Patent: Jul. 17, 1984

[54] SOLVENT EXTRACTION OF OIL BEARING SEEDS

[75] Inventors: Leon J. Rubin; Levente L. Diosady, both of Toronto; Colin R. Phillips, Gormley, all of Canada

[73] Assignee: University of Toronto Innovations Foundation, Toronto, Canada

[21] Appl. No.: 326,363

[22] Filed: Dec. 1, 1981

[51] Int. Cl.$^3$ .............................. A23J 1/12; A23J 1/14; C07G 7/00
[52] U.S. Cl. ............................. 260/123.5; 260/412.2; 260/412.4
[58] Field of Search ................ 260/412.4, 412.2, 123.5

[56] References Cited

U.S. PATENT DOCUMENTS

| | | | |
|---|---|---|---|
| 2,384,388 | 9/1945 | Monte | 260/412.4 X |
| 2,544,409 | 8/1951 | Rubin | 260/412.4 X |
| 2,560,935 | 7/1951 | Dickinson | 260/412.4 |
| 2,605,271 | 7/1952 | Hunn et al. | 260/412.4 |
| 3,392,026 | 7/1968 | Mustakas et al. | 260/123.5 X |
| 3,560,217 | 2/1971 | Youngs et al. | 260/123.5 X |
| 3,732,108 | 5/1973 | Eapen et al. | 260/412.4 X |
| 3,734,901 | 5/1973 | Hayes et al. | 260/412.4 X |
| 3,878,232 | 4/1975 | Hayes et al. | 260/412.4 |
| 4,009,290 | 2/1977 | Okumori et al. | 260/412.4 X |
| 4,083,836 | 4/1978 | Anjou et al. | 260/123.5 |
| 4,158,656 | 6/1979 | Jones et al. | 260/123.5 |
| 4,221,731 | 9/1980 | Short et al. | 260/412.4 X |
| 4,244,973 | 1/1981 | Van Megen | 260/123.5 X |
| 4,376,133 | 3/1983 | Farnand | 260/123.5 X |

FOREIGN PATENT DOCUMENTS 2030441 4/1980 United Kingdom .

OTHER PUBLICATIONS

Jones, J. American Oil Chemist Soc. vol. 56, pp. 716-721 (1979).

Primary Examiner—Helen M. S. Sneed
Attorney, Agent, or Firm—Lalos, Leeds, Keegan, Lett, Marsh, Bentzen & Kaye

[57] ABSTRACT

This invention relates to a process for the extraction of oilseeds and oilseed materials with two mutually immiscible solvents, the first solvent comprising a lower alkanol containing dissolved ammonia, and the second solvent comprising a lower alkane or halogenated lower alkane. The process yields two improved products, a proteinaceous meal of reduced glucosinolate content and a high quality triglyceride oil, both acceptable as food ingredients.

11 Claims, No Drawings

SOLVENT EXTRACTION OF OIL BEARING SEEDS

This invention relates to extraction of oilseeds. More particularly, it relates to methods of extracting oilseeds of the Cruciferae plants group, to obtain therefrom edible oils and proteinaceous meal.

Oil bearing seeds, such as rapeseed, mustard and crambe, from the plants of the Cruciferae type are an important source of edible oils and potential source of high quality protein. The oils therefrom can be hydrogenated to make margarine and similar products. However, the proteinaceous meal which is left after oil extraction by known methods contains unwanted constituents such as glucosinolates, phenolics, phytin etc., which should be removed from the protein meal of these seeds or at least reduced in quantity therein, in order for the meal to be acceptable for human consumption. The reduction or removal of glucosinolates is particularly important, since they are broken down by enzymes present in the seed and in the human body, producing various degradation products that interfere with the production of thyroxin in the body. Thus for human food use, the glucosinolate content of, for example, rapeseed meal should be substantially eliminated to ensure complete product safety. Other constituents such as phenolics, phytin and fibre are indigestible and aesthetically or nutritionally undesirable, or give off-flavours, and should be removed.

In present commercial practice, rapeseeds are cracked and cooked at about 90°–110° C., the oil is then partially mechanically expelled from the seeds, leaving the meal. Then the meal is solvent extracted with, for example, hexane which dissolves out residual oil, desolventised and dried. The initial cooking step in the process inactivates the enzyme myrosinase, which is responsible for the breakdown of glucosinolates into thioglucoside derivatives, but it also damages a significant amount of the proteins in the seed. However, the glucosinolates are left intact in the meal in this process. If the meal is subsequently used for human consumption the undesirable degradation products may be formed subsequently, by the action of enzymes produced by bacteria in the gastrointestinal tract.

Much effort has been devoted in recent years to producing modified varieties of oil-bearing seeds, especially rapeseeds, by breeding techniques, with the objective of lowering the glucosinolate content of the seeds. Considerable success has been achieved in this area, especially in Canada, resulting in the development of rapeseed varieties referred to as canola, which have a glucosinolate content reduced about 7-fold. Nevertheless, the glucosinolate content even of canola meals produced by conventional processes is still too high to permit its use in human foods. They still contain about 1–2 mg glucosinolate per gram of meal, which is too high to ensure product safety.

The present invention provides a process by which proteinaceous meal effectively free from glucosinolates originally present in the seed may be produced from oil bearing seeds such as rapeseed, resulting in a proteinaceous meal suitable for human consumption, along with a triglyceride oil of high quality and improved properties. In essence, the present invention employs a two solvent extraction system, one of the solvents being lower alkanol containing dissolved ammonia and the other solvent being an organic liquid suitable for use in the production of food products, and substantially immiscible with the alkanol/ammonia, such as an alkane or a halogenated alkane.

Thus according to one aspect of the present invention, there is provided a process of solvent treating protein-containing material derived from oil-bearing seeds of the Cruciferae group so as to separate therefrom oil components and to obtain proteinaceous meal of reduced glucosinolate content, which comprises:

treating the material with two substantially mutually immiscible solvents, the first said solvent comprising a lower alkanol containing dissolved ammonia, and the second said solvent comprising a lower alkane or a halogenated lower alkane, recovering, as a solid material insoluble in both said solvents, a proteinaceous meal of substantially reduced glucosinolate content, and recovering oil components of the material from solution in said second solvent.

The two solvents may be contacted with the material in either order, or simultaneously, and useful results obtained. The second solvent (hereinafter referred to as the non-polar solvent) will dissolve the triglyceride oil component, along with the phospholipid (gum) content. The first solvent (hereinafter referred to as the polar solvent) will dissolve the glucosinolate component or conversion products thereof, some of the carbohydrate content and some of the phenolic content. It will also dissolve the phospholipids. Thus, if the oilseed material is contacted first with the polar solvent and only the components insoluble in the polar solvent are then treated with the non-polar solvent, the oils subsequently recovered from the non-polar solvent have reduced phospholipid content, which is desirable. However, the percentage of oil recovered in this procedure is reduced, since the oil is slightly soluble in the polar solvent. If, on the other hand, the oilseed material is contacted first with the non-polar solvent and then the resulting solids are contacted with the polar solvent, the oil recovered from the non-polar solvent needs to be further treated to reduce its phospholipid content. In the preferred manner of conducting the process, therefore the oilseed material is first contacted with the polar solvent, and then the non-polar solvent is added to the mixture of oilseed material and polar solvent. In this way, a three-phase system is established, namely, a polar liquid phase, a non-polar liquid phase and a solid phase of insoluble materials. The polar solvent has the effect of opening the cell walls to allow more thorough solvent extraction of the cell contents. With such use, the traditional toasting of the material with its consequent deleterious effect on the protein quality, is avoided. Since the oil is preferentially soluble in the non-polar solvent, substantially all the oil moves into the non-polar liquid phase and dissolves in the non-polar solvent. No significant amounts of oil are thus lost to the polar solvent phase. Conversely, since the phospholipids (gums) are preferentially soluble in the polar phase, substantially all the phospholipids move into and dissolve in the polar phase, to be eventually recovered or discarded. As a result, the oil that is recovered from the non-polar solution is substantially free from phospholipids, and needs to undergo minimal or no treatment to remove these products.

The polar solvent for use in the present invention may be any lower alkanol, e.g. having 1–6 carbon atoms, which is substantially immiscible with the chosen non-polar solvent and which does not dissolve triglyceride oils to any great extent. Suitable such alkanols are methanol, ethanol, isopropanol, t-butyl alcohol and the like, or mixtures of two or more of such alcohols. Most preferred is methanol, on account of its high polarity and its ability to dissolve adequate quantities of ammonia without difficulty. In preparing the preferred polar solvent, gaseous ammonia is absorbed in methanol, until an ammonia concentration of about 5–15%, most preferably about 10%, is achieved. Presence of small amounts, e.g. 5%, of water is desirable so as to reduce the mutual solubility of the methanol and hexane and ensure clean liquid phase separation. When using higher alkanols, the presence of small amounts of water seem to be essential to ensure high polarity and sufficient dissolved ammonia. Large amounts of water, e.g. 25%–50%, are undesirable, since the protein content is to some degree soluble in the water, and so substantial amounts of protein will be lost if too much water is used. In all cases, except when the alkanol is methanol, the presence of water enhances the effect of the polar solvent in the destruction of glucosinolates. Preferred ranges appear to be from about 5% to 15% ammonia and up to about 15% water, based on the nature and amount of alkanol used.

Suitable non-polar solvents are those materials which are good solvents for triglyceride oils, are substantially immiscible with the alcohol of the polar solvent, and are suitable for use in the production of foodstuffs. Examples include liquid paraffinic hydrocarbons, e.g. of 4–8 carbon atoms, and chlorinated and fluorinated derivatives of lower paraffinic hydrocarbons. Preferred are $C_5$–$C_7$ alkanes. Most preferred is hexane, on account of its established utility in edible oil extraction.

The oilseed materials used are those derived from plants of the Cruciferae type, for example rapeseed, mustard, crambe, etc. and are suitably cracked or ground before extraction, to allow satisfactory solvent penetrations. If necessary, but not essentially, the hulls may be removed, e.g. by air classification before the material is subjected to solvent extraction. Whilst the process of the invention shows greatest advantages when applied to cracked or ground seeds, commercially prepared meal, such as Canola meal, can also be used in this process. Such meal is preferably ground before extraction. Rapeseed is the most preferred starting material. It has an oil content of about 40–45% and a protein content of about 22–24%.

When the process is to be conducted in two stages, with successive solvent uses, a mixture of the lower alcohol containing 5–15% ammonia is preferably added first, directly to the oilseed material, and the suspension is subsequently agitated to ensure mixing. This ammonia-alkanol system will efficiently eliminate the glucosinolates from the oilseed material, over a wide range of operating conditions, depending to some extent on the choice of alkanol used. Generally, increased ammonia concentration, higher solvent to meal ratios and longer extraction times all tend towards more complete glucosinolate removal. Especially good results are obtained at a solvent to oilseed material v/w ratio of 2 to 1 or greater, when methanol is used, an ammonia concentration of about 10%, a water concentration of up to 10%, preferably 4–6% based on the amount of solvent used, and an exposure time of fifteen minutes or more. These operating conditions are generally sufficient for the reduction of glucosinolate content to less than 0.3 mg/g. After the alcohol-ammonia treatment is completed, the proteinaceous solids residue may be separated from the supernatant solvent liquids by any suitable method such as filtration, decanting, centrifugation, etc. The proteinaceous solids residue is then treated by extracting with a non-polar solvent, preferably hexane, to remove therefrom the oil, phospholipids or non-polar constituents still present. Room temperatures and pressures are suitable. This extraction is followed by a suitable separation method, e.g. filtration or centrifugation, to separate supernatant solution from the solid proteinaceous residue.

The non-polar phase when separated from the protein residue, as above, contains the triglyceride oils originally contained in the starting oilseed material. These oils may be separated by vacuum distillation or other standard methods, to yield the triglyceride oils and recover the non-polar solvent.

In the more preferred process, however, the hexane is added during the ammonia-alcohol extraction, resulting in a two-phase solvent system. The most preferred method contemplates addition of the ammonia-alcohol solvent to the oilseed material, and the subsequent addition, after an interval of time, of the non-polar solvent such as hexane to the oilseed material-polar solvent combination. Otherwise, conditions of treatment are substantially as in the two-step procedure. This simultaneous extraction of the oilseed material results in three phases: solid proteinaceous residue, polar liquid phase and non-polar liquid phase, which are readily separable by known methods. The triglyceride oils and the protein meal may be separated and refined by the methods previously described.

By means of the process of the present invention, whether oilseed material is extracted simultaneously or successively with the two solvents, there can be obtained protein meal from rapeseed having a glucosinolate content at or below the detection limit of standard analytical techniques. One can obtain meals with protein contents ranging from 45%–50% such that, typically, 90% or more of the protein originally present in the seeds is recovered in the meal.

The simultaneous two-phase solvent extraction system of the preferred embodiment of this invention offers the prospect of glucosinolate removal and defatting in a compact process to produce a meal of enhanced protein content and suitable for use in human foodstuffs. Not only does the resulting meal have negligible harmful glucosinolate content, but also the content of phenolic compounds herein is reduced. This improves both the color and the flavor of the resulting product, and the carbohydrate content of the end product is also reduced.

Moreover, a significantly improved triglyceride oil is produced as a result of the process of the present invention. As noted, conventional rapeseed oil as extracted by a process involving seed cracking, cooking to deactivate enzymes, mechanical expression of oil and treatment of the residue with hexane, contains a significant phospholipid (gum) content, which must be removed, e.g. by hydration and/or phosphoric acid treatment. In the process of the invention, phospholipids are removed in the polar solvent phase, thereby obviating the need for separate phospholipid removal steps in the oil refining stages. In addition, oil produced by the conventional process is likely to contain sulphur-containing compounds resulting from the enzymatic degradation of the glucosinolates in the seeds prior to the myrosinase destruction in the aqueous cooking step. These sulphur compounds interfere with the subsequent hydrogenation process for converting the oil into margarines, shortenings and the like, by acting as hydrogenation-catalyst poisons. Oil resulting from the process of the present invention does not contain significant amounts of these sulphur compounds since they are preferentially soluble in the polar solvent phase, not the non-polar phase. Hence the resulting oil is easier to hydrogenate.

The invention is further described and illustrated in the following non-limiting examples.

EXAMPLE 1

Ammonia-containing methanol was prepared, by placing 800 ml methanol in a 1 liter suction filtration flask, and bubbling ammonia gas into the methanol with continuous stirring and cooling for a predetermined period of time. Various solutions of different ammonia contents were prepared in this way.

30 g samples of rapeseed (Regent variety) were weighed out and crushed, then introduced into a Waring commercial blender. Approximately 200 ml of the ammonia-methanol solution was added to the rapeseed in the blender, and agitated therein at low speed for 2 minutes. Then, approximately 200 ml of hexane was added to the mixture and the blending agitation continued for another 2 minutes, at low speed. Thereafter, the mixture was filtered and the solid (rapeseed cake) was dried in an air flow oven at 50° C.

The filtrate liquid so obtained was shaken in a separatory funnel and allowed to settle, whereupon it separated into an upper hexane phase and a lower methanol/ammonia phase. The methanol/ammonia phase was drained off, and washed with hexane several times, to ensure full extraction of the oil from the methanol/ammonia phase, the washings being recombined with the original hexane phase. The oil was recovered from the hexane by evaporation in vacuo.

The dried rapeseed cake was weighed and then extracted with hexane using a Soxhlet extractor, to recover any residual oil therefrom. The oil was recovered from the hexane using a rotary evaporator and weighed. The residual, oil free meal was dried, weighed and analysed.

To determine the glucosinolate content of the rapeseed meal, a sample of the test material is subjected to enzymatic hydrolysis using myrosinase, with simultaneous extraction of the isothiocyanates into methylene chloride, conversion thereof to thioureas and quantitative determination of the thioureas by UV spectroscopy (see Wetter & Youngs, "A Thiourea-UV assay for Total Glucosinolate Content in Rapeseed Meals", J. Amer. Oil. Chem. Soc., 53, 162–164, 1976). The oxazolidinethiones formed on hydrolysis can also be determined by UV spectrophotometry (see D.I. McGregor "Quantitative Analysis of the Glucosinolates of Rapeseed and Brassica Juncea Mustard by Spectrophotometry of Thioureas and Oxazolidinethiones", Agriculture Canada Research Station, September 1978). The total glucosinolate content is obtained and expressed as milligram equivalents of 3-butenyl isothiocyanate per gram of oil-free meal.

When a rapeseed sample was extracted, as described above, with a 10–11% ammonia/methanol solution, a concentration of 0.4 mg/g glucosinolate was obtained. Protein content determinations are made by the Kjeldahl method (N×6.25), on both the initial material and final meal. Results are given in the following Table 1.

TABLE I

| SAMPLE NO. | AMMONIA CONCENTRATION in METHANOL, % | GLUCOSINOLATE, mg/g | PROTEIN IN MEAL, % | PROTEIN RECOVERY % |
|---|---|---|---|---|
| 1 | 0 (pure methanol) | 1.55 | 47.3 | 87 |
| 2 | 2 | 1.10 | 47.6 | 93 |
| 3 | 4 | 1.05 | 48.3 | 100 |
| 4 | 6 | 0.75 | 48.9 | 90 |
| 5 | 7 | 0.80 | 51.3 | 91 |
| 6 | 8 | 0.41 | 50.8 | 88 |
| 7 | 9 | 0.57 | 48.0 | 87 |
| 8 | 10 | 0.43 | 49.0 | 79 |
| 9 | 11 | 0.49 | 50.2 | 88 |
| 10 | 12 | 0.45 | 51.0 | 82 |
| 11 | 13 | 0.62 | 47.8 | 85 |
| 12 | 14 | 0.51 | 47.3 | 84 |

EXAMPLE 2

Approximately 200 ml of an ammonia/methanol polar extracting solvent, containing 10% dissolved ammonia and varying amounts of water in admixture with the polar solvent was added to a 30 g sample of crushed rapeseed in the blender, and agitated therein at low speed for 2 minutes. Then, after a 15 minute period of rest, approximately 200 ml hexane was added to the mixture and the blending agitation continued for another 2 minutes, at low speed. Glucosinolate and protein determinations were conducted as in Example 1. The results are given in Table II.

TABLE II

| SAMPLE NO. | % WATER | GLUCOSINOLATE CONTENT IN MEAL mg/g |
|---|---|---|
| 13 | 0 | 0.22 |
| 14 | 5 | 0.11 |
| 15 | 10 | 0.07 |
| 16 | 15 | 0.01 |

The increased polarity caused by water addition thus appears to have a beneficial effect on the reduction of the glucosinolate content, in the resulting meal.

EXAMPLE 3

The procedure of Examples 2 was essentially repeated, except that isopropanol was used as the alkanol, in place of methanol. Various ammonia contents and various amounts of water were used in the polar solvent, with hexane as the non-polar solvent as before. The results are given in Table III.

TABLE III

| SAMPLE | % WATER (Based on volume of isopropanol) | % AMMONIA, Based on weight of Isopropanol) | Glucosinolate Content in Meal, mg/gm |
| --- | --- | --- | --- |
| 17 | 0 | 7.5 | 1.40 |
| 18 | 5 | 9.8 | 1.83 |
| 19 | 10 | 10.0 | 1.49 |
| 20 | 15 | 10.0 | 1.06 |

These results indicate that, with a "higher" alkanol such as isopropanol, substantial amounts of water in the polar solvent are desirable for efficient glucosinolate removal.

EXAMPLE 4

The procedure of Example 2 was essentially repeated, except that ethanol was used as the alcohol, in place of methanol. The ammonia content dissolved in the ethanol was constant at 10%. Various amounts of water were added to the polar solvent mixture. Hexane was again used as the non-polar solvent. The results are given in Table IV.

TABLE IV

| SAMPLE NO. | % WATER (Based on volume of ethanol | Glucosinolate Content in Meal, mg/gm |
| --- | --- | --- |
| 21 | 0 | 1.19 |
| 22 | 5 | 0.25 |
| 23 | 10 | 0.35 |
| 24 | 15 | 0.14 |

These results again illustrated the desirability of water presence, when using alkanol higher than methanol.

EXAMPLE 5

In this example, rapeseed meal prepared in a pilot plant was used. In this process, rapeseed is toasted at 90°–100° C. and subsequently extracted with boiling hexane in a continuous pilot plant extractor. The resulting defatted rapeseed material, wet with hexane, is air-desolventized to produce a substantially oil-free rapeseed meal.

25 g samples of defatted, air-desolventized rapeseed meal (Tower variety) were placed in flasks with a measured volume (75–500 ml) of ammonia-methanol solution, prepared by the procedure of Example 1. The meals were extracted on a Burrel wrist-action shaker for 15–120 minutes, filtered and washed with 200 ml methanol and then allowed to dry overnight at room temperature.

The glucosinolate and protein contents of the meals were then determined by the method described in Example 1. Results are given in the following Table V.

TABLE V

| SAMPLE NO. | AMMONIA CONC. WT. % | SOLVENT VOLUME (ml) | EXTRACTION TIME (Min.) | PROTEIN CONTENT (N × 6.25) | GLUCOSINOLATE CONTENT (mg/g) |
| --- | --- | --- | --- | --- | --- |
| 25 | 6.0 | 250 | 30 | 49.6 | 0.62 |
| 26 | 10.4 | 250 | 30 | 49.9 | 0.45 |
| 27 | 11.8 | 250 | 30 | 50.0 | 0.39 |
| 28 | 14.3 | 250 | 30 | 50.6 | 0.28 |
| 29 | 7.5 | 75 | 30 | 49.8 | 0.69 |
| 30 | 7.5 | 175 | 30 | 47.7 | 0.59 |
| 31 | 7.5 | 375 | 30 | 50.0 | 0.47 |
| 32 | 7.5 | 500 | 30 | 48.6 | 0.43 |
| 33 | 7.5 | 250 | 15 | 48.3 | 0.76 |
| 34 | 7.5 | 250 | 30 | 48.8 | 0.52 |
| 35 | 7.5 | 250 | 60 | 49.4 | 0.30 |
| 36 | 7.5 | 250 | 120 | 50.4 | 0.24 |

EXAMPLE VI

The procedure of example 2 was repeated, except that tertiary butanol was used as the alcohol, in place of methanol. Various ammonia contents and various amounts of water were used in the polar solvent, with hexane as the non-polar solvent as before. The results are given in the table below:

TABLE VI

| SAMPLE NO. | % WATER (Based on Volume of t-butanol) | % AMMONIA (Based on Weight of t-butanol) | GLUCOSINOLATE CONTENT in Meal (mg/gm) |
| --- | --- | --- | --- |
| 37 | 0 | 4.8 | 1.39 |
| 38 | 5 | 8.1 | 1.81 |
| 39 | 10 | 10.0 | 1.58 |
| 40 | 15 | 10.0 | 1.44 |

We claim:

1. A process of solvent treating protein-containing solid material derived from oil-bearing seeds of the Cruciferae group so as to separate therefrom oil components and to obtain proteinaceous meal of reduced glucosinolate content, which comprises:

contacting the material with a first, polar liquid solvent comprising a lower alkanol having 1–6 carbon atoms containing dissolved ammonia at a concentration of at least 5%, to effect extraction of glucosinolate from the solid material;

subsequently contacting the material with a second, non-polar solvent comprising a lower alkane or a halogenated lower alkane, to effect extration of oil components from the solid material, said first and second solvents being substantially mutually immiscible;

recovering, as a solid material insoluble in both said solvents, a proteinaceous meal of substantially reduced glucosinolate content, and recovering oil components of the material from solution in the second non-polar solvent.

2. The process of claim 1, wherein the second solvent is a non-polar, $C_5$–$C_7$ alkane.

3. The process of claim 1 wherein said second non-polar solvent is contacted with the mixture of the protein material and the first, polar liquid solvent, so as to form a two-phase liquid system along with a third, solid phase of insoluble material.

4. The process of claim 3, wherein the protein containing material is cracked oilseeds.

5. The process of claim 4, wherein the protein containing material is cracked rapeseed.

6. The process of claim 4, wherein the polar solvent also includes up to about 15% water, based on the amount of alkanol.

7. The process of claim 6, wherein the polar solvent is methanol containing dissolved ammonia.

8. The process of claim 7, wherein the non-polar solvent is hexane.

9. The process of claim 8, wherein the ammonia content of the polar solvent is from about 5% to about 15%, based on the weight of alkanol.

10. The process of claim 2 or claim 3, wherein the protein material is meal resulting from the partial or substantially total removal of triglyceride oil from rapeseeds.

11. A process of solvent extracting cracked rapeseed so as to separate therefrom oil components and to obtain proteinaceous meal of reduced glucosinolate content, which comprises extracting the cracked rapeseed with a polar solvent consisting essentially of methanol having ammonia dissolved therein at a concentration of about 10% in the presence of about 5% water, then adding hexane to the rapeseed-polar solvent mixture, agitating the mixture so formed, recovering from the mixed solvent system a proteinaceous meal which is substantially insoluble in both the polar solvent and the hexane and which has a glucosinolate content of less than about 0.5 mg/gm, allowing to the polar solvent liquid phase and the hexane liquid phase to separate, removing the two liquid phases from contact with one another, and recovering triglyceride oils from the non-polar solvent.

* * * * *